United States Patent [19]

Ando et al.

[11] Patent Number: 4,875,119

[45] Date of Patent: Oct. 17, 1989

[54] HEAD LOADING MECHANISM FOR FLEXIBLE DISC DRIVE

[75] Inventors: Yashiko Ando, Tachikawa; Yasushi Noda, Tokyo; Yohji Abe, Kiyose, all of Japan

[73] Assignee: Teac Corporation, Tokyo, Japan

[21] Appl. No.: 162,999

[22] Filed: Mar. 2, 1988

[30] Foreign Application Priority Data

Mar. 3, 1987 [JP] Japan .............................. 62-30912[U]
Mar. 3, 1987 [JP] Japan .............................. 62-30913[U]
Mar. 5, 1987 [JP] Japan .............................. 62-32474[U]

[51] Int. Cl.⁴ ............................................... G11B 5/54
[52] U.S. Cl. .................................................... 360/105
[58] Field of Search ................................ 360/105, 109

[56] References Cited

U.S. PATENT DOCUMENTS 4,709,281 11/1987 Inoue et al. .
4,709,286 11/1987 Koike .................................... 360/105

FOREIGN PATENT DOCUMENTS 90471 7/1981 Japan .

Primary Examiner—A. J. Heinz
Attorney, Agent, or Firm—Michael N. Meller

[57] ABSTRACT

A head loading mechanism for a flexible disc drive unit, for bringing and withdrawing a magnetic read/write head in contact with and from a flexible magnetic disc comprises a disc loading member rotatably supported in the disc drive unit, for positioning the magnetic disc at a fixed position wherein the magnetic disc is rotatably held; head loading member rotatably supported in the disc drive unit, for carrying the magnetic head; a head load bail member rotatably supported in the disc drive unit, for positioning the magnetic head over the magnetic disc with a gap ($g_1$) in a state where the bail member makes contact with the hed loading member; and an adjusting mechanism for adjusting a rotational position of the bail member with respect to the head loading member so that the gap ($g_1$) is varied.

14 Claims, 7 Drawing Sheets

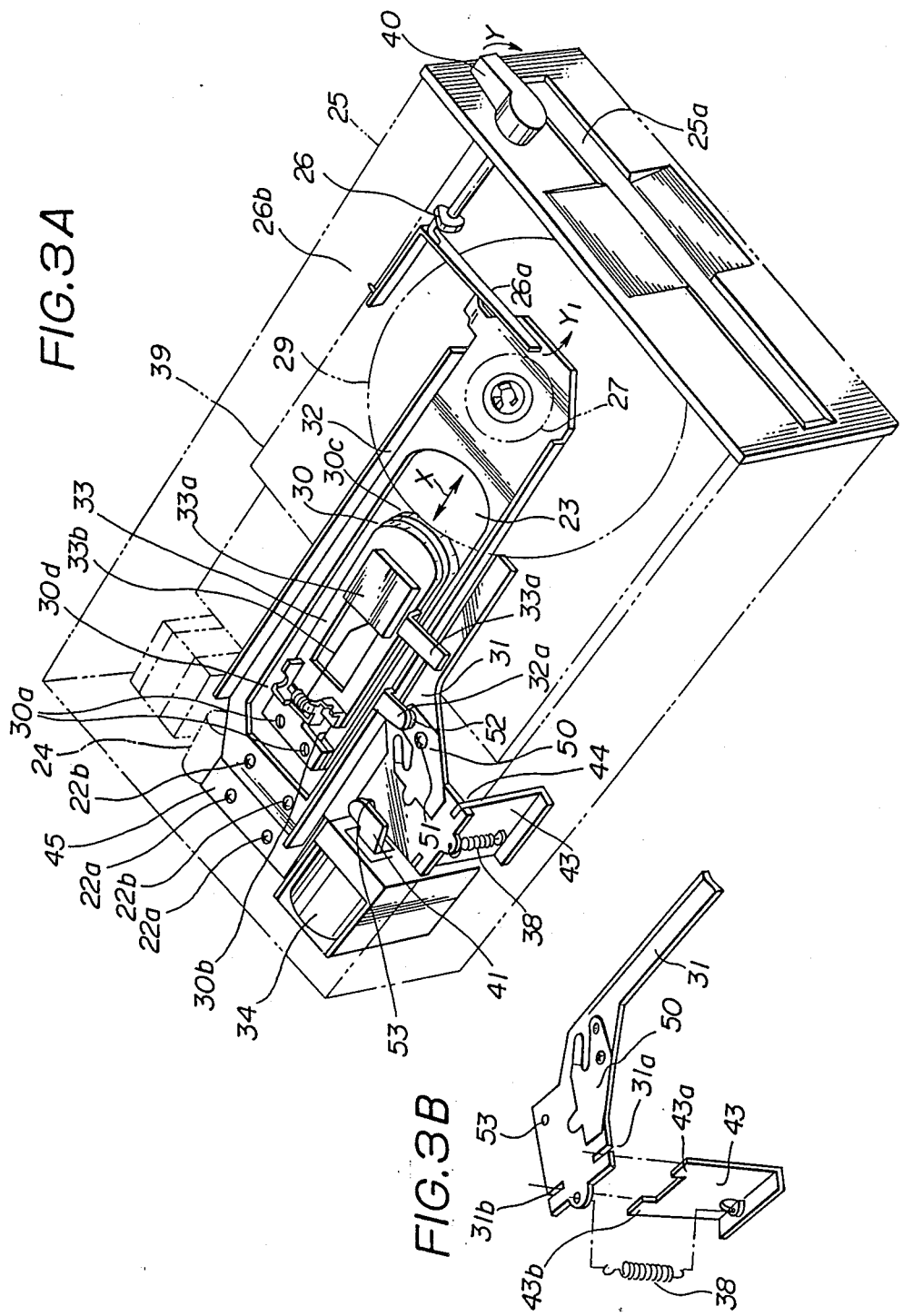

HEAD LOADING MECHANISM FOR FLEXIBLE DISC DRIVE

BACKGROUND OF THE INVENTION

The present invention generally relates to head loading mechanisms for a flexible (floppy) disc drive unit, and in particular to a head loading mechanism for bringing into contact and withdrawing a magnetic read/write head with and from a flexible magnetic disc.

Currently, a flexible disc drive unit (hereafter simply referred to as an FDD unit) is widely used as a data storage means. A flexible magnetic disc which is generally rotatably housed in a square and apertured jacket is inserted into the FDD unit through an entrance slot in the front thereof at the time of its use. The inserted magnetic disc is located and held on a spindle by a magnetic disc loading arm. The magnetic disc can be rotated by a spindle motor coupled with the spindle. A pair of magnetic read/write heads which are mounted on a magnetic head carriage are linearly transported and set over and under instructed track positions formed on storage surfaces of the magnetic disc by a carriage transporting mechanism. Thereafter, the magnetic heads are brought in contact with the disc surfaces by a head loading mechanism.

The head loading mechanism includes a head load bail which is rotatably supported and which may come in contact with a magnetic head loading arm of the head carriage. The head loading arm has one of the two heads and is urged by a spring so that it is withdrawn from the magnetic disc When the read/write operation is instructed, the head loading arm is rotatably moved against the spring force by the bail so that the magnetic head attached to the head loading arm approaches and makes contact with the disc storage surface. During the read/write operation, the magnetic head is kept in contact with the disc storage surface This state is called a head load state, and an operation to obtain the head load state is called a head loading operation. In the head load state, the magnetic disc is brought and kept in contact with the other magnetic head secured to a part of the head carriage opposite to the head loading arm. During the read/write operation, the bail disengages and is held away from the head loading arm.

When the desired read/write operation is completed, the bail is de-activated and rotates in the reverse direction. At this time, the bail comes in contact with the head loading arm again so that the magnetic head of the head loading arm is withdrawn from the disc surface. Then, the bail is brought into contact with the disc loading arm and is stopped thereby. As a result, the magnetic head of the head loading arm is held away from the magnetic disc. This state is called a head unload state and an operation to obtain this state is called a head unloading operation. Simultaneously, the magnetic head mounted on the part opposite to the head loading arm is separated from the magnetic disc.

In general, the bail is rotatably driven by an electromagnetic driving apparatus such as a plunger solenoid unit, which is disclosed in Japanese Laid-Open Patent Application No. 90471/1981, for example.

In the FDD unit, the head loading operation and the head unloading operation are frequently repeated Therefore, various problems described below may occur at the time of loading or unloading the magnetic head.

A position of the head loading arm in the head unload state is an important factor for obtaining smooth landing of the magnetic head secured to the head loading arm. In the head unload state, a gap must be formed between the magnetic head and the magnetic disc clamped on the spindle. The width of this gap is defined by the position of the head loading arm in the head unload state. In addition, the following fact is also an important factor for obtaining smooth lifting of the magnetic head. In the head load state, the bail is held away from the head loading arm. In other words, a gap is formed therebetween. If this gap is large, at the time of unloading the magnetic head, the bail strikes the head loading arm excessively strongly, so that the head loading arm is undesirably vibrated. The gap between the bail and the head loading arm is defined by a position of the bail in the head load state. In general, the bail is designed to make contact with the head loading arm by a finger which is a part of the head loading arm.

However, the conventional head loading mechanism does not have any effective mechanism for adjusting the gap between the magnetic head secured to the head loading arm and the magnetic disc held on the spindle. When taking into consideration an error at the time of assembling the mechanism, it is difficult to obtain the gap narrower than 0.5 mm. This value of the gap is insufficient to obtain the smooth landing of the magnetic head. In other words, the magnetic head strikes the disc excessively strongly at the time of loading the head. This distorts a signal waveform of an output of the magnetic head, and elongates a time spent until the head output is stabilized after the start of the head loading operation. Of course, it is impossible to write and read data on and from the magnetic disc during a unstable state of the head output. This prevents the speedy read/write operation.

The conventional head loading mechanism is also not provided with any effective mechanism for adjusting the position of the bail in the head load state, in other words, the gap between the bail and the finger part of the head loading arm. When taking into consideration an error at the time of assembling the mechanism, it is difficult to reduce the gap to smaller than 1 mm, which is not a satisfactory value for the bail to smoothly lift the magnetic head. That is, the head loading arm is strongly hit by the bail. Thereby, the magnetic head attached to the head loading arm is undesirably vibrated on the magnetic disc so as to repeatedly engage with and disengage from the magnetic disc This distorts the envelope of the output signal, so that a long time is taken until the head output becomes absolutely zero after the start of the head unloading operation. Furthermore, the above fact may cause damage to the magnetic disc and the magnetic head.

SUMMARY OF THE INVENTION

Accordingly, a general object of the present invention is to provide a novel and useful head loading mechanism for a flexible disc drive unit in which the disadvantages of the conventional head loading mechanism have been eliminated.

A more specific object of the present invention is to provide a head loading mechanism for a flexible disc drive unit in which there is provided an adjusting mechanism for adjusting a gap between a magnetic head fixed to a head loading arm and a magnetic disc in a head unload state.

Another object of the present invention is to provide a head loading mechanism for a flexible disc drive unit in which there is provided an adjusting mechanism for adjusting a gap between a head load bail and a head loading arm in a head load state.

The above objects of the present invention can be achieved by a head loading mechanism for a flexible disc drive unit, for bringing in contact and withdrawing a magnetic read/write head with and from a flexible magnetic disc, comprising a disc loading member rotatably supported in the disc drive unit, for positioning the magnetic disc at a fixed position where the magnetic disc is rotatably held; a head loading member rotatably supported in the magnetic drive unit, for carrying the magnetic head; and a head load bail rotatably supported in the disc drive unit, for positioning the magnetic head over the magnetic disc with a gap ($g_1$) in a state where the bail makes contact with the head loading member. The bail is urged by a bail urging member in a direction in which contact is made between the bail and the head loading member so that the magnetic head is withdrawn from the magnetic disc. The bail is driven by a driving unit so that it is disengaged from the head loading member against a force due to the bail urging member and thus brings the magnetic head into contact with the magnetic disc. The head loading mechanism of the present invention also comprises an adjusting mechanism for adjusting a rotational position of the bail with respect to the head loading member so that the gap ($g_1$) is varied.

According to another aspect of the present invention, there is provided an adjusting mechanism for adjusting a rotational position of the bail with respect to the head loading member so that a gap ($g_2$) formed between the bail and the head loading member when the magnetic head is kept in contact with the disc is varied.

Other objects, features and advantages of the present invention will become apparent from the following detailed description when read in conjunction with the accompanying drawings.

BRIEF DESCRIPTION OF THE DRAWINGS

FIG. 3A is a perspective view of an embodiment of a head loading mechanism according to the present invention in which it is provided in a flexible disc drive unit;

FIG. 3B is a disassembled perspective view of a head loading arm and a bail supporting plate which are structural parts of the head loading mechanism;

DETAILED DESCRIPTION

To facilitate the understanding of the present invention, a description will be given of a conventional head loading mechanism with reference to FIGS. 1A and 1B.

Figure 1A:
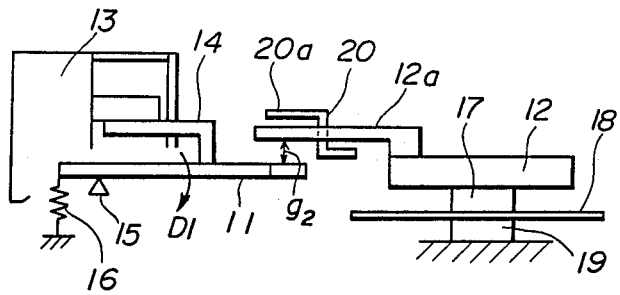
FIGS. 1A and 1B are views for explaining a conventional head loading mechanism.

FIG. 1A shows a head load state where magnetic heads are maintained in contact with storage surfaces of a flexible magnetic disc. FIG. 1B shows a head unload state where the magnetic heads are held away from the storage surfaces.

In the head load state shown in FIG. 1A, a plunger solenoid unit 13 is kept in an activated state and correspondingly a member 14 coupled with a plunger of the solenoid unit 13 is kept at a fixed lower position. An end of the member 14 presses a head load bail 11 downwardly. A spring 16 is stretched between an end of the bail 11 and a base of a flexible disc drive (FDD) unit. Thereby, the bail 11 is rotatable with respect to a supporting point 15 in a direction of an arrow D1 against the force due to the spring 16, and is held at a position which is determined by an end of a stroke of the plunger of the unit 13.

In response to the above rotation of the bail 11, a head loading arm 12 with a magnetic head 17 secured thereto moves downwardly. Thereby, the magnetic head 17 makes contact with an upper storage surface of a flexible magnetic disc 18 which is held on a spindle (not shown). Simultaneously, the magnetic disc 18 makes contact with a magnetic head 19 secured to a lower part of a head carriage. The head carriage which has the head loading arm 12 as a structural part thereof may be transported for accessing a desired track formed on the storage surfaces.

Figure 1B:
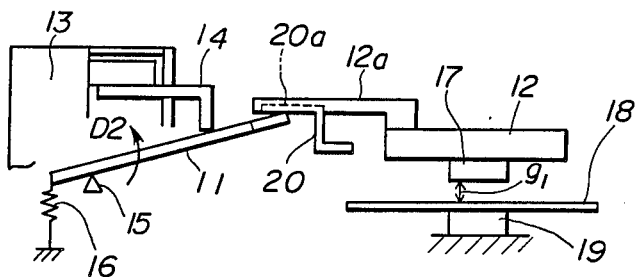

When the plunger solenoid unit 13 is turned-off or de-activated, the member 14 moves upwardly and thereby the bail 11 which is urged by the spring 16 rotates in a direction of an arrow D2, as shown in FIG. 1B. At this time, the bail 11 comes in contact with an engaging finger part 12a of the head loading arm 12, so that the head loading arm 12 is elevated. The bail 11 which is urged by the spring 16 is rapidly rotated and stops when the end of the bail 11 is brought in contact with an engaging finger part 20a of a magnetic disc loading arm 20. The finger part 20a acts as a stopper for the bail 11. Consequently, the magnetic heads 17 and 19 are withdrawn from and held away from the magnetic disc 18.

In the head load state shown in FIG. 1A, a gap $g_2$ is formed between the bail 11 and the finger part 12a of the head loading arm 12. Also, in the head unload state shown in FIG. 1B, a gap $g_1$ is formed between the upper storage surface of the disc 18 and a lowermost part of the magnetic head 17.

Figure 2A:
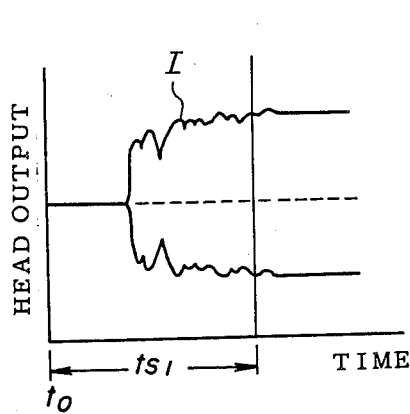
FIGS. 2A and 2B show waveforms of an output signal of a conventional magnetic head.

However, the conventional head loading mechanism does not have any effective mechanism for adjusting the gap $g_1$ between the magnetic head 17 secured to the head loading arm 12 and the magnetic disc 18 held on the spindle (not shown). When taking into consideration an error at the time of assembling the mechanism, it is difficult to obtain a gap $g_1$ smaller than 0.5 mm. This value of the gap $g_1$ is insufficient to obtain the smooth landing of the magnetic head 17. In other words, the magnetic head 17 strikes the disc 18 strongly. As shown in FIG. 2A, this distorts a signal waveform I of an output of the magnetic head 17, and elongates a time $t_{s1}$ taken until the head output is stabilized after the start of the head loading operation (at time $t_0$). Of course, it is impossible to write and read data on and from the magnetic disc 18 during the unstable state of a head output. This prevents the speedy read and write operation.

Figure 2B:
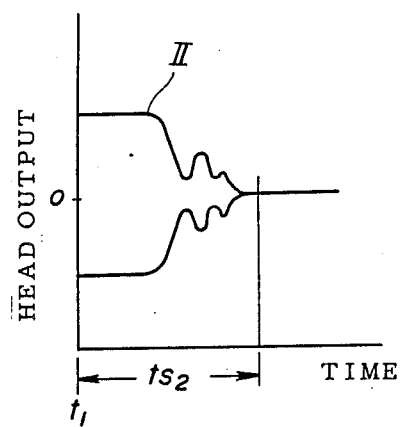

The conventional head loading mechanism is also not provided with any effective mechanism for adjusting the position of the bail 11 in the head load state, or the gap $g_2$ between the bail 11 and the finger part 12a of the head loading arm 12. When taking into consideration an error at the time of assembling the mechanism, it is difficult to decrease the gap $g_2$ so as to be narrower than 1 mm, which is not a satisfactory value to enable smooth lifting of the magnetic head 17 by the bail 11. That is, the finger part 12a of the head loading arm 12 is strongly hit by the bail 11. Thereby, the magnetic head 17 is undesirably vibrated on the magnetic disc so as to repeatedly engage and disengage with respect to the magnetic disc. As shown in FIG. 2B, this distorts an envelope II of an output signal of the magnetic head 17, so that a long time $t_{s2}$ is taken until the head output becomes absolutely zero after the start of the head unloading operation (at a time $t_1$). Furthermore, the above fact may cause damage to the magnetic disc 18 and the magnetic head 17.

A description will be given of an embodiment according to the present invention with reference to FIGS. 3A through 9.

FIG. 3A is a perspective view of an FDD unit in which an embodiment of a head loading mechanism according to the present invention is provided. FIG. 3B is a disassembled perspective view of a head loading arm and a bail supporting plate which are structural parts of the head loading mechanism. Referring to these Figures, a magnetic disc loading arm 32 is rotatably supported in a casing 25 in a state where an extreme end of the disc loading arm 32 is secured to a leaf spring member 45 by screws 22b. The leaf spring member 45 urges the disc loading arm 32 upwardly. The leaf spring member 45 is secured on a supporting member (not shown) provided in the casing 25 by screws 22a. The disc loading arm 32 has an opening 23 in which a head carriage 30 is located. A head loading arm 33 is a structural part of the head carriage 30, which has a lower carriage part 30c on which a lower magnetic read/write head is mounted. The head loading arm 33 is supported and urged upwardly by a leaf spring member 30b, which is mounted on a projecting part of the lower carriage part 30c by screws 30a. Additionally, the screws 30a fasten a coil spring supporting member 30d on the projecting part of the lower carriage part 30c. The coil spring supporting member 30d supports a coil spring 33b. One end of the coil spring 33b engages with the coil spring supporting member 30d and the other end engages with the head loading arm 33. The coil spring 33b has a function of pressing the head loading arm 33 downwardly. The lower carriage part 30c is slidably mounted on guide rods (not shown). Thereby, the head loading arm 33 can be transported in the opening 23 in a direction of an arrow X. The lower carriage can 33c can be driven by a driving unit 24 including a stepping motor. The head loading arm 33 accommodates an upper magnetic read/write head 35 (FIG. 4A) inside a shield member 33a thereof.

Figure 4A:
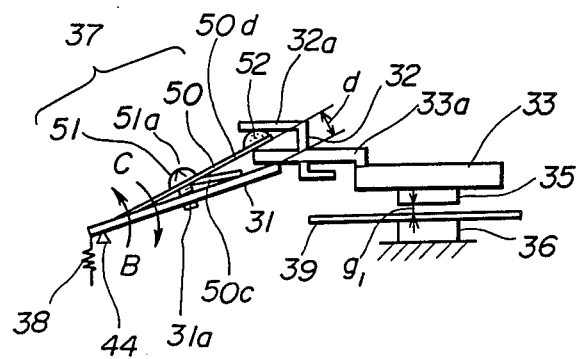
FIGS. 4A through 4C are side views of essential parts of the embodiment shown in FIGS. 3A and 3B, for explaining functions thereof.
Figure 4B:
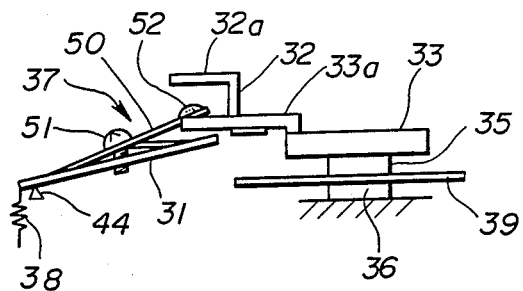
Figure 4C:
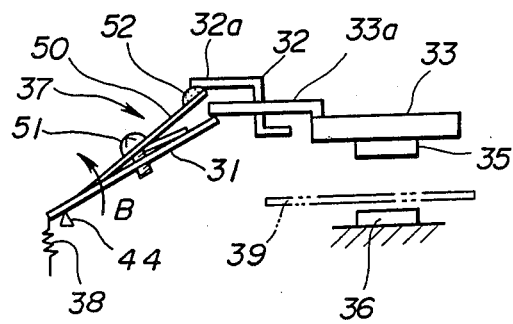
Figure 5:
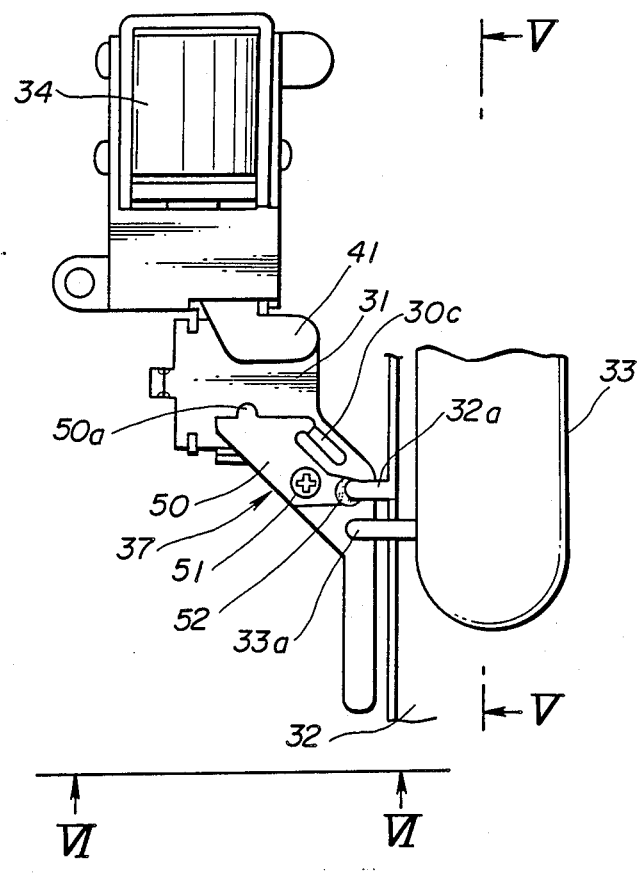
FIG. 5 is a plan view of essential parts of the embodiment shown in FIGS. 3A and 3B.

A flexible magnetic disc 39 which is usually rotatably housed in a square and apertured jacket is inserted into the FDD unit through a slot 25a in the front of the casing 25. At this time, the disc loading arm 32 is maintained at an unclamped position where it is greatly separated from the magnetic disc 39 as shown in FIG. 4C. After totally inserting the disc 39 into the FDD unit, a handle 40 on the front of the casing 25 is manually turned in a direction Y. In response to the manual operation, a mechanism 26 which is linked to the handle 40 is activated. A member 26a of the mechanism 26 is rotatably supported on a wall of the casing 25 as indicated by a reference 26b. In response to the rotation of the handle 40 in the direction Y, the member 26a presses down an extreme portion of the disc loading arm 32, so that the arm 32 is rotated downwardly. Then, a clamper 27 secured to the disc loading arm 32 becomes fitted into a central opening of the magnetic disc 39. Finally, the magnetic disc 39 is clamped on a spindle (not shown) which is linked to a motor 29.

When the handle 40 is manually turned in a reverse direction and maintained at the original position, the disc loading arm 32 moves upwardly, so that the disc 39 can be ejected.

When the magnetic disc 39 has not been inserted into the FDD unit, as shown in FIG. 4C, the disc loading arm 32 is maintained at the unclamped position. A coil spring 38 is stretched between an end portion of a head load bail 31 and a bail supporting plate 43 secured on the base of the FDD unit. As shown in FIG. 3B, the bail 31 has cutouts 31a and 31b. The bail supporting plate 43 has projections 43a and 43b at its top, which are fitted into the cutouts 31a and 31b. The width of each of the cutouts is a little greater than the thickness of each of projections 43a and 43b. With this structure, the bail 31 is rotatably supported on the bail supporting plate 43. The top of the bail supporting plate 43 makes a supporting point 44 shown in FIGS. 4A through 4C. The spring 38 is used to force the bail 31 in the direction B around the supporting point 44, as shown in FIG. 4C where the disc may be inserted into the FDD unit. In this state, the bail 31 is kept in contact with a finger part 33a of the head loading arm 33. In addition, a finger part 32a of the disc loading arm 32 is kept in contact with a buffer member 52 which is a structural part of an adjusting mechanism 37 which is mounted on and secured to the bail 31, as will be described in detail later. Therefore, the head loading arm 33 is maintained at the unclamped position where the magnetic head 35 is held greatly away from the disc 39.

When the magnetic disc 39 is inserted into the FDD unit through the slot 25a in the front of the casing 25, and the handle 40 is manually turned in the direction Y, the member 26 presses the extreme portion of the disc loading arm 32 down. Then, the disc loading arm 32 is rotatably moved downwardly as indicated by the arrow Y1 against the force due to the spring 38. In response to the descent of the disc loading arm 32, the head loading arm 33 also goes down in a direction of an arrow C in FIG. 4A, and approaches the upper storage surface of the disc 39 in a state where the finger part 33a of the head loading arm 33 is kept in contact with the bail 31. Then, the disc loading arm 32 is held at a fixed position which is determined by the mechanism 26. The finger part 32a of the disc loading arm 32 makes contact with the adjusting mechanism 37 which is mounted on the bail 31. Therefore, the bail 31 is positioned by the disc loading arm 32. In this state, the bail 31 is kept in contact with the finger part 33a of the head loading arm 33. As a result, the head loading arm 33 is positioned. In this state, the magnetic head 35 is held at a small distance away from the upper storage surface of the disc 39, as shown in FIG. 4A. At this time, the lower magnetic head 36 makes contact with the lower storage surface of the disc 39. The state shown in FIG. 4A is a head unload state or clamped state.

When a plunger solenoid unit 34 shown in FIG. 3A is activated during the state shown in FIG. 4A, a head loading operation is carried out as follows. The activation of plunger solenoid unit 34 causes a bracket 41 coupled with a plunger thereof to be rotated downwardly. The bail 31 is then pressed downwardly and rotated in the direction C. In response to the descent of the bail 31, the magnetic head 33 moves downwardly and lands on the upper storage surface of the magnetic disc 39. In this way, the head loading operation is carried out. The state shown in FIG. 4B is a head load state. In the head load state, the buffer member 52 of the adjusting mechanism 37 and the bail 31 are held away from the finger parts 32a and 33a of the disc and head loading arms 32 and 33, respectively. The head 35 is urged downwardly by the coil spring 33b shown in FIG. 3A to maintain the contact of the head 35 with the disc 39.

When the plunger solenoid unit 34 is de-activated, the bail 31 is moved in the direction B shown in FIG. 4A due to the force of the spring 38. The bail 31 comes in contact with the finger arm 33a of the head loading arm 33 again and lifts it. The buffer member 52 of the adjusting mechanism 37 also comes in contact with the finger arm 32a of the disc loading arm 32. Then, the magnetic head 35 is held in the head unload state shown in FIG. 4A. In this way, the head unloading operation is carried out.

A description will be given of the adjusting mechanism 37 for adjusting a position of the magnetic head 35 in the head unload state shown in FIG. 4A. The adjusting mechanism 37 includes a leaf spring member 50 shown in FIG. 8, which is mounted on the upper surface of the bail 31. The leaf spring member 50 has a projection 50a which is inserted into a corresponding recess formed on the upper surface of the bail 31. The leaf spring member 50 is secured on the upper surface of the bail 31 by an adjusting screw 51 which is passed through a hole 50b formed in a central portion of the member 50 and which engages with a tapped hole formed on the upper surface of the bail 31. The leaf spring member 50 also has an inclination part 50c which is inclined downwardly as well as an engaging arm part 50d facing the inner surface of the finger part 32a of the disc loading arm 32.

Referring to FIG. 4A, as the adjusting screw 51 is tightened, the leaf spring member 50 is pressed by a head 51a of the screw 51. Then, the inclination part 50c is elastically distorted so as to be made flat. In response to this distortion, the leaf spring member 50 gradually approaches the opposite surface of the bail 31. As a result, a gap d between the engaging arm part 50d and the upper surface of the bail 31 becomes narrower.

Adversely, as the adjusting screw 51 is loosened, the leaf spring member 50 is elastically restored to its original configuration due to the force produced by the inclination part 50c. Therefore, the gap d becomes wider.

As seen from FIG. 4A, the engaging arm part 50d engages with the finger part 32a of the disc loading arm 32 in the head unload state. Hence, as the gap d becomes wider, the bail 31 is deviated in the direction C, and correspondingly the magnetic head 35 moves down. Alternatively, as the gap d becomes narrower, the bail 31 is deviated in the direction B, and correspondingly the magnetic head 35 is elevated.

In this way, it is possible to adjust the gap $g_1$ or a height of the magnetic head 35 with respect to the upper surface of the clamped disc 39. It is preferable to adjust the gap $g_1$ in a range of 0.2 to 0.3 mm, which corresponds to approximately a half of the gap $g_1$ in the conventional mechanism. For this reason, shock occurring when the head 35 is brought in contact with the upper storage surface of the disc 39 is reduced, compared to that for the conventional mechanism. Therefore, the head 35 secured to the head loading arm 33 can smoothly land on the opposite surface of the disc 39.

Figure 9:
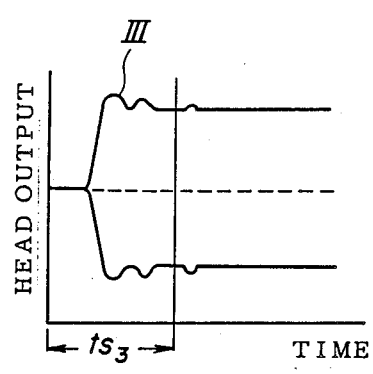
FIG. 9 shows a waveform of an output signal of a magnetic head at the time of loading the magnetic head.

FIG. 9 shows a waveform of an output signal III of the head 35 at the time of loading the head 35. A rise of an envelope of the output signal III has a distortion that is much smaller than that shown in FIG. 2A. Therefore, a time $t_{s3}$ until the output becomes stable after the start of the head load is made far shorter than the time $t_{s1}$ shown in FIG. 2A. This results in an advantage of speeding up the read/write operation. Furthermore, a probability that the shock will damage the magnetic head 35 and the magnetic disc 39 can be reduced.

Figure 6:
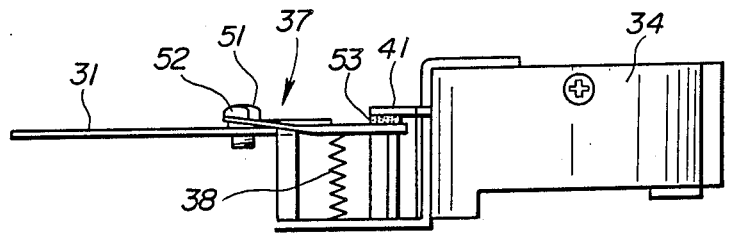
FIG. 6 is a sectional view taken along line V—V shown in FIG. 5, wherein a head loading arm shown in FIG. 5 is omitted.
Figure 7:
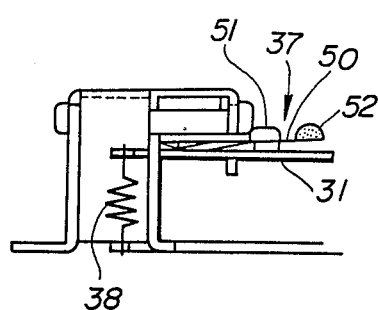
FIG. 7 is a sectional view taken along line VI—VI shown in FIG. 5, wherein a disc loading arm and a head loading arm are omitted.
Figure 8:
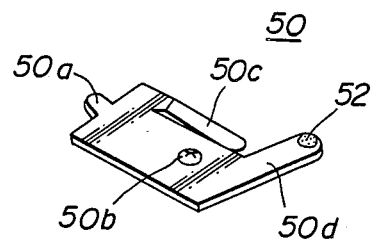
FIG. 8 is a perspective view of a leaf spring member used in the embodiment shown in FIGS. 3A and 3B.

As indicated previously, the buffer member 52 is attached to the extreme portion of the engaging arm part 50d of the leaf spring member 50. In addition, as shown in FIG. 6, a buffer member 53 is attached to a portion of the upper surface of the bail 31 which makes contact with the bracket 41 of the plunger solenoid unit 34. The buffer members 52 and 53 may be made of hard rubber, for example. The buffer members 52 and 53 contribute to reducing noise at the time of loading the magnetic head 35.

It is also possible to provide the adjusting mechanism with the finger part 32a of the disc loading arm 32. In this case, the mechanism may be constituted by an adjusting screw which engages with a tapped through hole formed in the finger arm 32a of the disc loading arm 32 so that the mechanism makes contact with the upper surface of the bail 31.

A description will be given of another embodiment of a head loading mechanism according to the present invention with reference to FIGS. 10A, 10B and 11. In these Figures, the same reference numerals as those in the previous Figures denote the same elements.

Figure 10A:
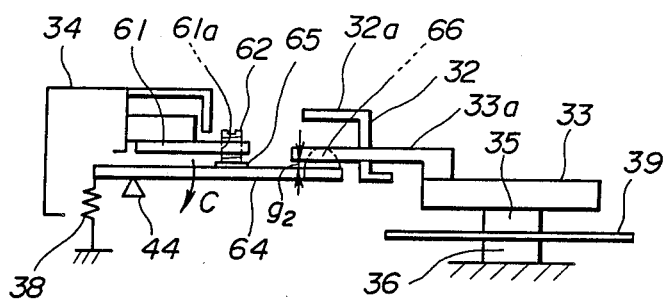
FIGS. 10A and 10B are views of essential parts of another embodiment according to the present invention.
Figure 10B:
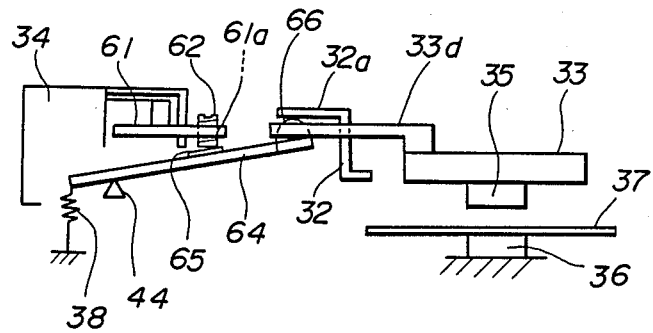

FIGS. 10A and 10B show a head load state and a head unload state of the mechanism, respectively. FIG. 11 is a perspective view of the mechanism.

A bracket 61 is used in place of the bracket 41 described before. An adjusting screw 62 is fitted into a tapped through hole 61a formed at an end portion of the bracket 61. A lower end of the adjusting screw 62 makes contact with a buffer member 65 mounted on a bail 64. Although the adjusting mechanism 37 described previously is not illustrated in FIGS. 10A, 10B and 11, it may be used in addition to the structure shown therein.

Figure 11:
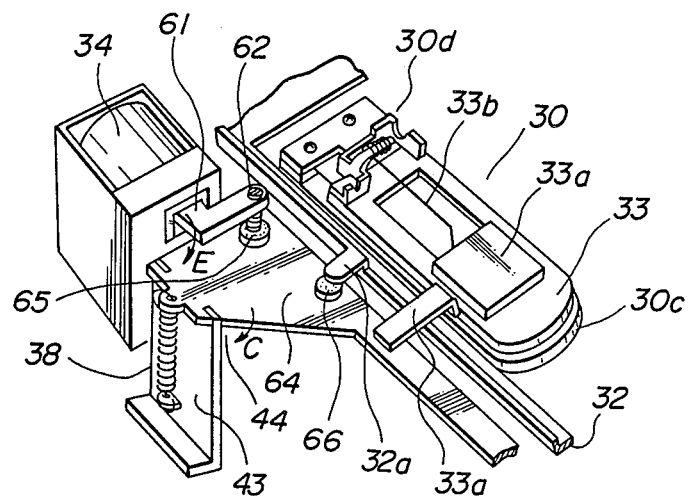
FIG. 11 is a perspective view of essential parts of the embodiment shown in FIGS. 10A and 10B.

When the plunger solenoid unit 34 is activated, the bracket 61 driven by the unit 34 is rotated in a direction of an arrow E in FIG. 11. In response to this rotation of the bracket 61, the bail 64 is rotated in a direction of an arrow C. The bracket 61 is kept at a position which is defined by the plunger solenoid unit 34. Thereby, the bail 64 is kept at a position which is determined by the stationary position of the bracket 61. In this state, as shown in FIG. 10A, there is formed a gap $g_2$ between the upper surface of the bail 64 and the lower surface of the finger part 33a of the head loading arm 33. According to the illustrated embodiment, the position of the bail 64 which is defined by the stationary position of the bracket 61, in other words, the gap $g_2$, is adjustable by the adjusting screw 62. The lower end of the adjusting screw 62 is maintained in contact with the buffer member 65 which is mounted on and secured to the upper surface of the bail 61.

When the adjusting screw 62 is turned so as to be tightened, the screw 62 presses the bail 64 and moves it in the direction C. Conversely when the screw 62 is loosened, the bail 64 is rotated with respect to the supporting point 44 in a direction opposite to the direction C. Thereby, it becomes possible to adjust the gap $g_2$ between the upper surface of the bail 64 and the lower surface of the finger part 33a of the head loading arm 33. That is, an error at the time of assembling the head loading mechanism can be compensated by the adjustment of the adjusting screw 62. It is preferable to set the gap $g_2$ to approximately 0.3 mm, which is smaller than that in the conventional mechanism.

Figure 12:
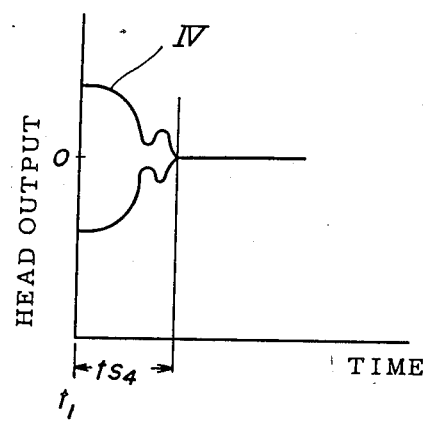
FIG. 12 shows a waveform of an output signal of a magnetic head at the time of unloading the magnetic head.
Figure 13:
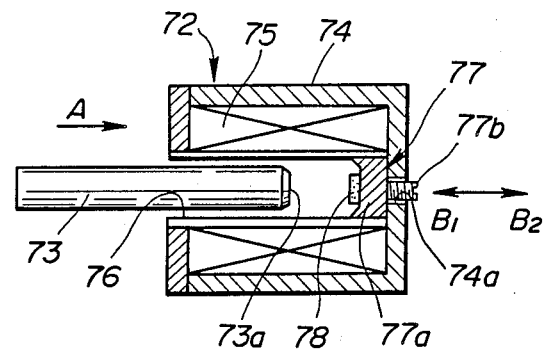
FIG. 13 is a cross sectional view of a plunger solenoid unit which is used in the embodiments.
Figure 14:
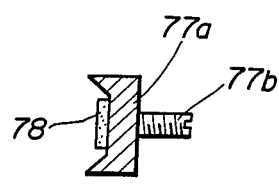
FIG. 14 is a view showing a plunger receiving member used in the plunger solenoid unit shown in FIG. 13.

When the bail 64 comes in contact with the finger part 33a of the head loading arm 33 at the time of unloading the head 35, the shock applied to the head loading arm 33 is reduced, because the gap g is made smaller than that in the conventional mechanism. Therefore, the undesirable vibration of the head loading arm 33 can be greatly reduced. Therefore, as shown in FIG. 12, an envelope of an output signal IV of the magnetic head 35 has only a small distortion, so that the output signal can immediately become zero. As a result, a time $t_{s4}$ from de-activation of the plunger solenoid unit 34 to a time when the output signal becomes zero is reduced, as compared with the time $t_{s2}$ in the conventional mechanism. This results in stabilization of the head unloading operation. In addition, the probability that the magnetic head 35 and the magnetic disc 39 will be damaged can be reduced.

The buffer member 65 may be attached to the bail 64 by fitting it into a recess formed on the upper surface of the bail 64. The buffer member 65 may also be attached to the bail 64 by adhesive. Another buffer member 66 is mounted on and fixed to an upper surface part of the bail 64 which faces the finger part 33a of the head loading arm 33. The buffer members 65 and 66 contribute to reducing the shock and noise which occur when they are hit by the respective members. The buffer member 65 and 66 may be made of neoprene, for example.

A description will be given of the plunger solenoid unit 34 used in the above embodiments, by referring to FIGS. 13 through 16.

The plunger solenoid unit 34 consists of a unit body 72 and a plunger 73. The body 72 has a frame 74, on an inner wall of which there is mounted a solenoid coil 75. The frame 74 has a central hollow cylindrical hole 76 formed inside the wound solenoid coil 75. An opening of the hole 76 is formed in the front of the frame 74. The plunger 73 is movably inserted into the hole 76. A plunger receiving unit 77 is provided on an inner wall portion of the frame 74 which is opposite to the opening of the hole 76. The plunger receiving unit 77 has a function of limiting the movement of the plunger 73 when the unit 34 is activated. The plunger receiving unit 77 is composed of a receiving part 77a and a screw part 77b. The screw part 77b engages with a tapped through hole 74a formed on the inner wall portion of the frame 74 opposite to the opening. An end of the screw part 77b projects from the outer surface of the frame 74. The receiving part 77a has a recess part which matches with an opposite end of the plunger 73. A disc-shaped buffer member 78 is mounted on the bottom of the recess of the receiving member 77a and fixed thereto by an adhesive or a double coated adhesive tape, for example.

Figure 16:
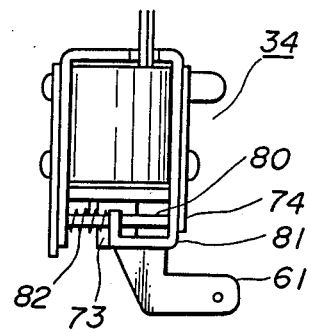
FIG. 16 is a plan view of a plunger solenoid unit used in the embodiments where a front cover thereof has been removed.

The plunger 73 is coupled with the bracket 61, as shown in FIG. 16 where a front cover of the unit 34 has been removed. The plunger 73 is mechanically coupled with a member 81 of the bracket 61 so that the member 81 is rotatably moved in response to the linear movement of the plunger 73. The member 81 is also supported by a rod 80 which is passed through opposite walls of the member 81 and rotatably supported by the frame 74 of the unit 34. The member 81 is forced upwardly by a coil spring 82 wound around the rod 80.

Figure 15:
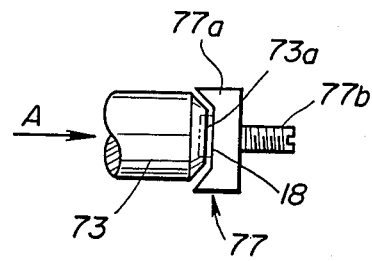
FIG. 15 is a view showing a state where the plunger is forced against the plunger receiving member.

When a fixed power is supplied to the solenoid coil 75, the plunger 73 is transported in a direction of an arrow A due to an attracting force produced by the coil 75 and approaches the receiving member 77. Then, as shown in FIG. 15, the plunger 73 hits the buffer member 78 on the receiving member 77 and compresses it in the direction A. The plunger 73 loses speed rapidly as it compresses the buffer member 78. Then, the plunger 73 stops in a state where the buffer member 78 is deformed.

As seen from the above description, the plunger receiving member 77 contributes to reducing shock in the plunger 73 and noise which occurs when the plunger 73 stops. The stop position of the plunger 73 determines the bail position in the head load state shown in FIG. 4B or 10A. The undesirable vibration of the plunger 73 may cause vibration of the bail 31 or 64 which is kept in contact with the finger part 33a of the head loading arm 33. Therefore, there is a probability that the magnetic head 35 attached to the head loading arm 33 is also vibrated. The plunger receiving member 77 can eliminate this probability.

The stop position or a stroke of the plunger 73 is adjustable by turning the screw part 77a. That is, the plunger receiving member 77 varies its position in response to the movement of the screw part 77b in a direction B1 or B2.

The present invention is not limited to the embodiments described above, but various variations and modifications may be made without departing from the scope of the present invention.

What is claimed is:

1. A head loading mechanism for a flexible disc drive unit, for bringing into contact and withdrawing a magnetic read/write head with and from a flexible magnetic disc, comprising:
    disc loading means rotatably supported in the disc drive unit, for positioning the magnetic disc at a fixed position where the magnetic disc is rotatably held;

head loading means rotatably supported in the disc drive unit, for carrying the magnetic head;

head load bail means rotatably supported in the disc drive unit, for positioning the magnetic head over the magnetic disc with a gap ($g_1$) in a state where the bail means makes contact with the head loading means;

bail urging means for urging the bail means in a direction in which contact is made between the bail means and the head loading means so that the magnetic head is withdrawn from the magnetic disc;

driving means for driving the bail means to be disengaged from the head loading means against a force due to the bail urging means to bring the magnetic head into contact with the magnetic disc; and adjusting means for adjusting a rotational position of the bail means with respect to the head loading means so that the gap ($g_1$) is varied, the adjusting means being mounted on the bail means to rotate together with the bail means and engaging with the disc loading means so as to determine the rotational position of the bail means with respect to the head loading means.

2. A head loading mechanism for a flexible disc drive unit, for bringing into contact and withdrawing a magnetic read/write head with and from a flexible magnetic disc, comprising:

disc loading means rotatably supported in the disc drive unit, for positioning the magnetic disc at a fixed position where the magnetic disc is rotatably held;

head loading means rotatably supported in the disc drive unit, for carrying the magnetic head;

head load bail means rotatably supported in the disc drive unit, for positioning the magnetic head over the magnetic disc with a gap ($g_1$) in a state where the bail means make contact with the head loading means;

bail urging means for urging the bail means in a direction in which a contact is made between the bail means and the head loading means so that the magnetic head is withdrawn from the magnetic disc;

driving means for driving the bail means to be disengaged from the head loading means against a force due to the bail urging means to bring the magnetic head into contact with the magnetic disc; and adjusting means for adjusting a rotational position of the bail means with respect to the head loading means so that the gap ($b_1$) is varied, the adjusting means being a leaf spring member which is mounted on the bail means, and making contact with the disc loading means when the disc loading means is positioned at the fixed position.

3. A head loading mechanism as claimed in claim 2, wherein the leaf spring member is urged in a direction so as to lift the disc loading means.

4. A head loading mechanism as claimed in claim 2, wherein the leaf spring member is secured on a surface of the bail means which is opposite to the disc loading means by an adjusting screw which is passed through a central portion of the leaf spring member and which elastically deforms the leaf spring member.

5. A head loading mechanism as claimed in claim 4, wherein the leaf spring member has a inclination part which engages with the bail means and an arm part which makes contact with the disc loading means.

6. A head loading mechanism as claimed in claim 5, wherein a buffer member is provided on the arm part of the leaf spring member which makes contact with the disc loading means.

7. A head loading mechanism as claimed in claim 1, wherein a width of the gap ($g_1$) is set in a range of 0.2 to 0.3 mm by the adjustment means.

8. A head loading mechanism for a flexible disc drive unit, for bringing into contact and withdrawing a magnetic read/write head with and from a flexible magnetic disc, comprising:

disc loading means rotatably supported in the disc drive unit, for positioning the magnetic disc at a fixed position where the magnetic disc is rotatably held;

head loading means rotatably supported in the disc drive unit, for carrying the magnetic head;

head load bail means rotatably supported in the disc drive unit, for positioning the magnetic head over the magnetic disc with a gap ($g_1$) in a state where the bail means makes contact with the head loading means;

bail urging means for urging the bail means in a direction in which contact is made between the bail means and the head loading means so that the magnetic head is withdrawn from the magnetic disc;

driving means for driving the bail means to be disengaged from the head loading means against a force due to the bail urging means to bring the magnetic head into contact with the magnetic disc; and adjusting means for adjusting a rotational position of the bail means with respect to the head loading means so that the gap ($g_1$) is varied, the driving means being a plunger solenoid unit such that a stop position of a plunger thereof when activated is determined by a plunger receiving member for receiving an extreme end of the plunger, and the plunger receiving member is adjustable in position in the directions of movement of the plunger.

9. A head loading mechanism as claimed in claim 8, wherein the plunger receiving member has a buffer member which is positioned thereon to make contact with the end of the plunger.

10. A head loading mechanism for a flexible disc drive unit, for bringing into contact and withdrawing a magnetic read/write head with and from a flexible magnetic disc, comprising:

disc loading means rotatably supported in the disc drive unit, for positioning the magnetic disc at a fixed position where the magnetic disc is rotatably held;

head loading means rotatably supported in the disc drive unit, for carrying the magnetic head;

head load bail means rotatably supported in the disc drive unit, for supporting the magnetic head over the magnetic disc with a gap ($g_1$) in a state where the bail means makes contact with the head loading means;

bail urging means for urging the bail means in a direction in which contact is made between the bail means and the head loading means so that the magnetic head is withdrawn from the magnetic disc;

driving means for driving the bail means to be disengaged from the head loading means against a force due to the bail urging means to bring the magnetic head into contact with the magnetic disc;

adjusting means for adjusting a rotational position of the bail means with respect to the head loading means so that a gap ($g_2$) formed between the bail means and the head loading means when the magnetic head is kept in contact with the disc can be varied, the driving means is a plunger solenoid unit such that a stop position of a plunger thereof when activated is determined by a plunger receiving member for receiving an extreme end of the plunger, and the plunger receiving member is adjustable in position in the directions of movement of the plunger.

11. A head loading mechanism as claimed in claim 10, wherein the plunger receiving member has a buffer member which is positioned thereon to make contact with the end of the plunger.

12. A head loading mechanism for a flexible disc drive unit, for bringing into contact and withdrawing a magnetic read/write head with and from a flexible magnetic disc, comprising:

disc loading means rotatably supported in the disc drive unit, for positioning the magnetic disc at a fixed position where the magnetic disc is rotatably held;

head loading means rotatably supported in the disc drive unit, for carrying the magnetic head;

head load bail means rotatably supported in the disc drive unit, for supporting the magnetic head over the magnetic disc with a gap ($g_1$) in a state where the bail means makes contact with the head loading means;

bail urging means for urging the bail means in a direction in which contact is made between the bail means and the head loading means so that the magnetic head is withdrawn from the magnetic disc;

driving means for driving the bail means to be disengaged from the head loading means against a force due to the bail urging means to bring the magnetic head into contact with the magnetic disc;

adjusting means for adjusting a rotational position of the bail means with respect to the head loading means so that a gap ($g_2$) formed between the bail means and the head loading means when the magnetic head is kept in contact with the disc can be varied, the adjusting means comprising an adjusting screw which engages with a tapped through hole formed in a bracket mechanically coupled to the driving means and which makes contact with the bail means; and a buffer member made of elastic material and provided on a surface position on the bail means which makes contact with the adjusting screw.

13. A head loading mechanism as claimed in claim 12, wherein said buffer member is made of hard rubber.

14. A head loading mechanism as claimed in claim 12, wherein another buffer member is provided on a surface position on the bail means which makes contact with the disc loading means.

* * * * *